United States Patent
Ormel et al.

(10) Patent No.: US 9,683,554 B2
(45) Date of Patent: Jun. 20, 2017

(54) ACOUSTIC NOISE MONITORING SYSTEM FOR A WIND TURBINE

(75) Inventors: Frank Ormel, Kolind (DK); Bryan Edwards, Southlake, TX (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 632 days.

(21) Appl. No.: 14/238,864

(22) PCT Filed: Aug. 8, 2012

(86) PCT No.: PCT/DK2012/050289
§ 371 (c)(1),
(2), (4) Date: Mar. 25, 2014

(87) PCT Pub. No.: WO2013/023660
PCT Pub. Date: Feb. 21, 2013

(65) Prior Publication Data
US 2014/0193257 A1 Jul. 10, 2014

Related U.S. Application Data

(60) Provisional application No. 61/523,883, filed on Aug. 16, 2011.

(30) Foreign Application Priority Data

Aug. 16, 2011 (DK) ................. 2011 70446

(51) Int. Cl.
*F03D 11/00* (2006.01)
*F03D 7/02* (2006.01)
*F03D 17/00* (2016.01)

(52) U.S. Cl.
CPC ........ *F03D 11/0091* (2013.01); *F03D 7/0296* (2013.01); *F03D 17/00* (2016.05);
(Continued)

(58) Field of Classification Search
CPC ..... F03D 17/00; F03D 7/0296; Y02E 10/273; Y02E 10/722; F05B 2270/81; F05B 2270/333
See application file for complete search history.

(56) References Cited

U.S. PATENT DOCUMENTS

2004/0151578 A1 8/2004 Wobben
2007/0031237 A1* 2/2007 Bonnet ............... F03D 7/048
415/1
(Continued)

FOREIGN PATENT DOCUMENTS

EP 1944667 A1 7/2008
EP 2333329 A2 6/2011
(Continued)

OTHER PUBLICATIONS

IEC 61400-11, ed. 2.1 2006-11. Wind turbine generator systems—Part 11: Acoustic noise measurement techniques, International Electrotechnical Commission, Geneva, 2006.
(Continued)

*Primary Examiner* — Phutthiwat Wongwian
*Assistant Examiner* — Jason T Newton
(74) *Attorney, Agent, or Firm* — Patterson + Sheridan, LLP

(57) ABSTRACT

The present invention relates to an acoustic noise monitoring system for a wind turbine, comprising: a microphone for monitoring acoustic noise, the microphone adapted to be mounted to the exterior of a wind turbine nacelle; an input, the input adapted to receive operating conditions data from a wind turbine; a processor, the processor adapted to receive data from the microphone and the input; and storage memory, adapted to store the acoustic noise data and the operating conditions data. The processor is adapted to apply a transfer function to said acoustic noise data to correlate said data with a set of acoustic noise data measured at a
(Continued)

remote location from the wind turbine. The system may comprise a controller adapted to generate a control signal, for outputting to a wind turbine controller, for adjusting the operating parameters of the wind turbine in dependence on said correlated data.

28 Claims, 4 Drawing Sheets

(52) U.S. Cl.
CPC ..... *F05B 2270/333* (2013.01); *F05B 2270/81* (2013.01); *Y02E 10/723* (2013.01)

(56) References Cited

U.S. PATENT DOCUMENTS

| 2008/0164091 A1* | 7/2008 | Kerber | F03D 7/0296 181/211 |
| 2009/0039650 A1* | 2/2009 | Nies | G05B 23/0229 290/44 |
| 2010/0098541 A1* | 4/2010 | Benito | F03D 7/0224 416/36 |
| 2010/0143117 A1* | 6/2010 | Xiong | F03D 7/0296 416/1 |
| 2010/0143119 A1* | 6/2010 | Kooijman | F03D 7/0212 416/1 |
| 2010/0284787 A1* | 11/2010 | Petersen | F03D 7/024 415/119 |
| 2011/0135442 A1* | 6/2011 | Kerber | F03D 17/00 415/1 |
| 2012/0321464 A1* | 12/2012 | Andersen | F03D 7/0296 416/1 |

FOREIGN PATENT DOCUMENTS

| WO | 03064853 A1 | 8/2003 |
| WO | 2010061255 A2 | 6/2010 |

OTHER PUBLICATIONS

Danish Search Report for PA 2011 70446, Mar. 13, 2012.
International Search Report for PCT/DK2012/050289, Oct. 30, 2012.

* cited by examiner

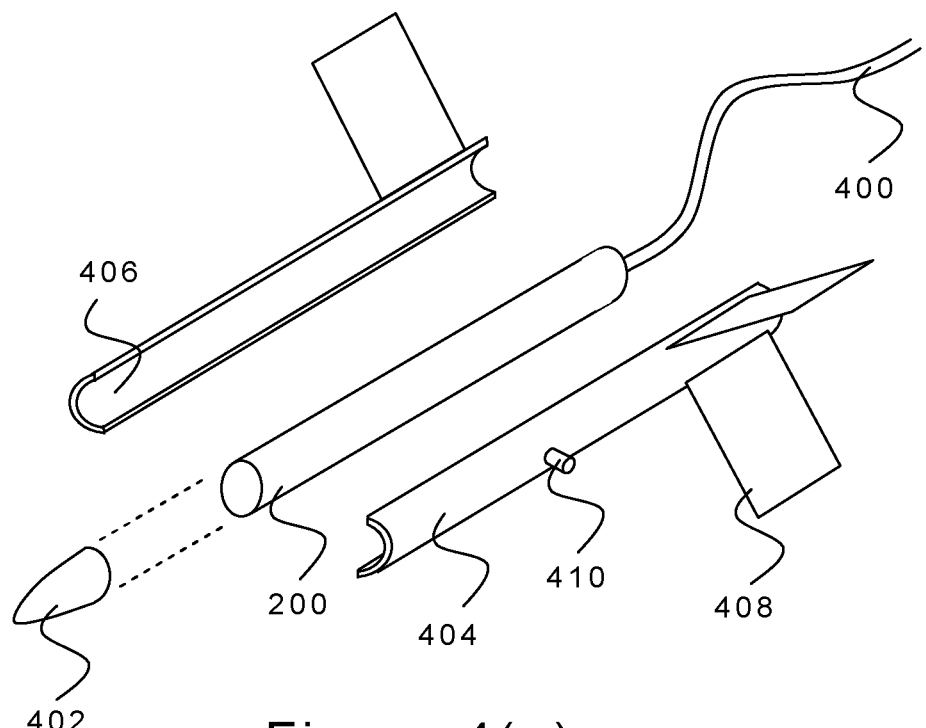
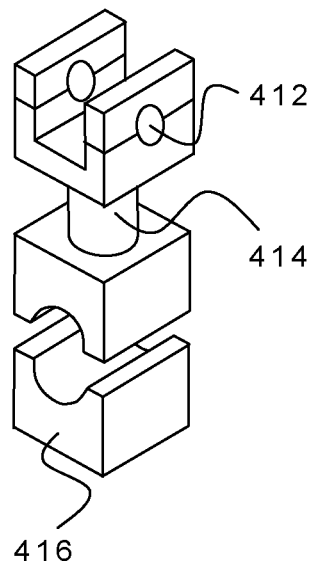
Figure 4(a)
Figure 4(b)

ACOUSTIC NOISE MONITORING SYSTEM FOR A WIND TURBINE

BACKGROUND OF THE INVENTION

The invention relates to a system for monitoring acoustic noise generated by a wind turbine. The invention also relates to a system for monitoring acoustic noise, and controlling a wind turbine in dependence on the monitored acoustic noise. Furthermore, the invention relates to a method of monitoring acoustic noise generated by a wind turbine.

It is known that wind turbines generate acoustic noise during operation, and that the noise generated is required to be below certain limits (such as those limits set by local legislation). Presently, the acoustic noise generated by wind turbine is measured in accordance with international standards (preferably, IEC (International Electrotechnical Commission) 61400-11). The standards call for acoustic noise measurement to be conducted by ground level microphones some distance from the wind turbine. The acoustic noise measurements, according to the standards, are conducted over a timescale of a few hours. This has limitations when attempting to both design wind turbines, and in controlling wind turbines during operation.

Therefore, we have appreciated that there is a need for a system that enables the acoustic noise generated by wind turbines to be measured in a way that enables the improved design and operation of wind turbines.

SUMMARY OF THE INVENTION

The invention is defined in the independent claims to which reference should be made. Advantageous features are set forth in the dependent claims to which reference should be made.

According to a first preferred aspect of the invention there is provided an acoustic noise monitoring system for a wind turbine, comprising: at least one microphone for monitoring acoustic noise, the or each microphone adapted to be mounted to the exterior of a wind turbine nacelle; an input, the input adapted to receive operating conditions data from a wind turbine; a processor, the processor adapted to receive data from the at least one microphone and the input; and storage memory, adapted to store the acoustic noise data and the operating conditions data. The processor is adapted to apply a transfer function to said acoustic noise data to correlate said data with a set of acoustic noise data measured at a remote location from the wind turbine. Providing such a system may allow the continuous monitoring of wind turbine performance in relation to noise generation, which may allow the optimisation of performance within specified noise limits. In addition, the system may be used during the development of wind turbines to aid in reducing the acoustic noise generated.

Transfer function connotes an algorithm used to adjust the measured acoustic noise data so that it is comparable to acoustic noise measurements made at a remote location (for example, on the ground behind the wind turbine).

Preferably, the system is adapted to continuously monitor the acoustic noise. By monitoring the acoustic noise levels continuously may enable the power output of wind turbines to be increased within acoustic noise limits.

Alternatively, the system may be adapted to monitor the acoustic noise at intervals. Thus the storage requirements may be reduced.

The system may be adapted to monitor the overall sound pressure level of the acoustic noise, and preferably a sound pressure level transfer function is applied to the overall sound pressure level data. In this way, the correlation between the sound pressure level of the measured acoustic noise and the sound pressure level of the remotely measured acoustic noise may be improved.

The system may also be adapted to monitor the tonality of the acoustic noise, and preferably a tonality transfer function is applied to the tonality data. Similarly, the correlation between the tonality of the measured acoustic noise and the tonality of the remotely measured acoustic noise may be improved.

The system may also be adapted to monitor one-third octave bands of the acoustic noise, and preferably a one-third octave band transfer function is applied to the one-third octave bands data. Again, similarly, the correlation between the one-third octave bands of the measured acoustic noise and the one-third octave bands of the remotely measured acoustic noise data may be improved.

Preferably, the set of acoustic noise data measured at a remote location is measured in compliance with a standard. More preferably, the standard is IEC 61400-11.

The system preferably has a substantially constant frequency response over at least the frequency range 20 Hz to 11,200 Hz. Thus more accurate measurements may be made.

Preferably, the at least one microphone is positioned so as to reduce noise from components within the nacelle. The position of the microphone is preferably towards the rear of the nacelle (i.e. furthest from the rotor) and on the bottom. Alternatively, the microphone is positioned on the top of the nacelle, or on the side of the nacelle, or on the back of the nacelle. The microphone may alternatively be positioned towards the front of the nacelle, or in any other suitable position along the length of the nacelle.

Preferably, the microphone comprises a wind screen. Thus the effects of wind noise may be reduced.

The system may further comprise mounting means for orienting the at least one microphone with the local air flow. By mounting the microphone such that it self-orients to the local air flow, the effects of wind noise may be reduced. Preferably, the mounting means comprises a gimbal arrangement, wherein the gimbal arrangement provides the mounted microphone with at least two degrees of freedom. The two degrees of freedom are preferably pitch and yaw. The term pitch connotes the movement of the longitudinal axis of the microphone about a lateral axis of the microphone. The term yaw connotes the movement of the longitudinal axis of the microphone about the vertical axis.

In order for the mounting means to self-orient the microphone with the local air flow, the gimbal arrangement preferably comprises a plurality of fins coupled to the microphone.

The measurements of the operating conditions data and the acoustic noise data are preferably synchronised. By synchronous measurements of the sets of data, an improved understanding of the influence factors on noise generation may be gained.

The received operating conditions may include meteorological data, and wind turbine performance data. Preferably, the meteorological data includes at least one of: atmospheric pressure; wind speed; wind direction; air temperature; and humidity. Preferably, the wind turbine performance data includes at least one of: load; power output; generator currents; pitch, yaw, yaw error; rpm; torque and operating temperatures.

The system may further comprise a controller, the controller adapted to receive said correlated data, and an output, in communication with said controller and a wind turbine controller. The controller is adapted to generate a control signal, for outputting to the wind turbine controller, for adjusting the operating parameters of the wind turbine in dependence on said correlated data. By providing a system that can monitor the acoustic noise generated by a wind turbine in real-time, and then utilising that data to control the operating parameters of the wind turbine the overall power output of the wind turbine may be increased. The overall power output may be increased since the wind turbine may be in operation for more time than a standard wind turbine. Alternatively, or in addition, the wind turbine may operate at a higher rpm, or in a mode that is known to generate less noise. Traditional methods of controlling the noise generation of wind turbines is to shut down the wind turbine during periods where noise generation is expected to be high, but measuring the noise generation continuously, and in real-time, allows the wind turbine to only be shut down, or the power output reduced, during periods when the generated noise actually exceeds thresholds set by, for example, legislation.

Preferably, the acoustic noise data are stored, within said storage means, for a sufficient time to enable the data to be verified and a control signal to be generated. More preferably, after the control signal is generated, the acoustic noise data is deleted, or over-written by new acoustic noise data. Thus, the storage requirements may be reduced.

Preferably, the controller is adapted to adjust at least one of the operating parameters: load; pitch, rpm, and power output. More preferably, the controller is adapted to adjust at least one of the load and the power output to reduce the acoustic noise generated by the wind turbine being measured. Yet more preferably, the controller is adapted to shut down the wind turbine if the acoustic noise rises above a threshold value, or if the tonality of the acoustic noise rises above a threshold value.

According to a further aspect of the present invention, there is provided a wind turbine comprising an acoustic noise monitoring system as described herein. The microphone is mounted to the exterior of the wind turbine nacelle.

The invention extends to apparatus and/or methods substantially as herein described with reference to the accompanying drawings.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Preferred embodiments of the invention will now be described, by way of example, and with reference to the drawings in which:

FIG. 4 show a mounting system for the microphones used in the acoustic noise monitoring system.

DETAILED DESCRIPTION OF PREFERRED EMBODIMENTS

Figure 1:
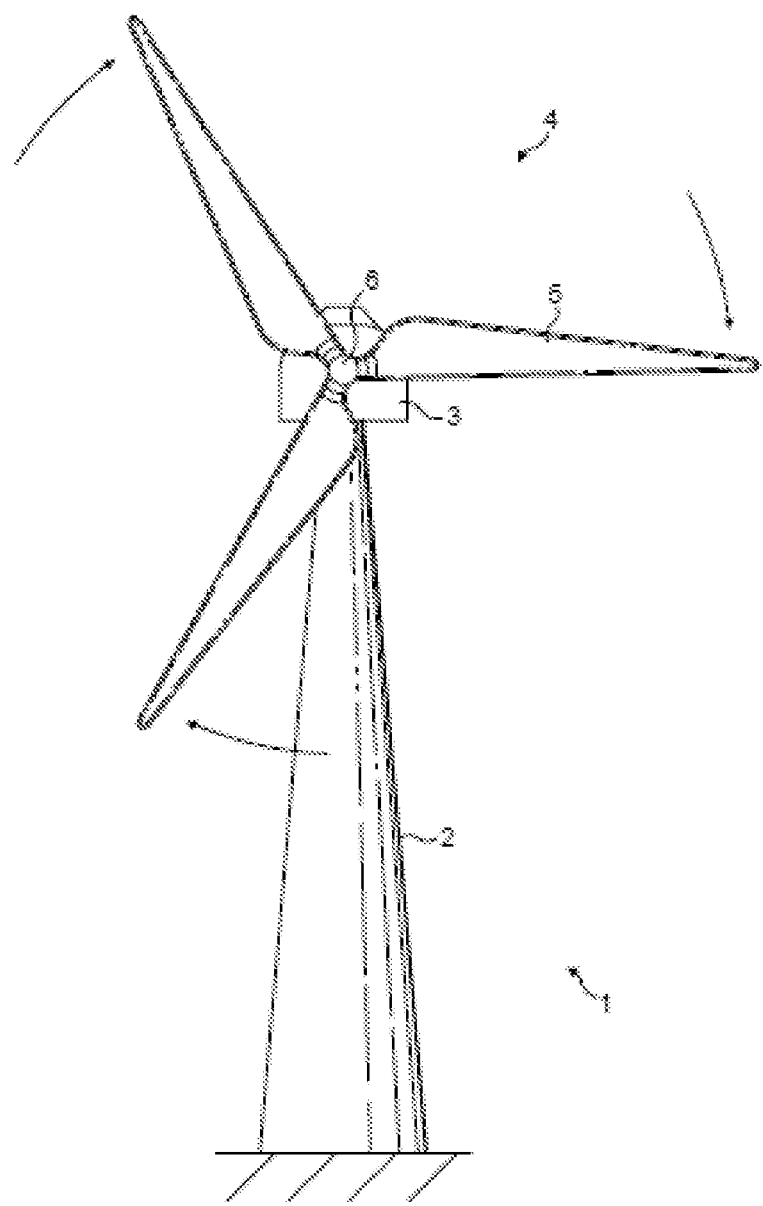
FIG. 1 shows a known wind turbine.

FIG. 1 shows a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended from domestic or light utility usage, or may be a large model used, such as those that are suitable for use in large scale electricity generation on a wind farm for example. In the latter case, the diameter of the rotor could be as large as 100 meters or more.

Figure 2:
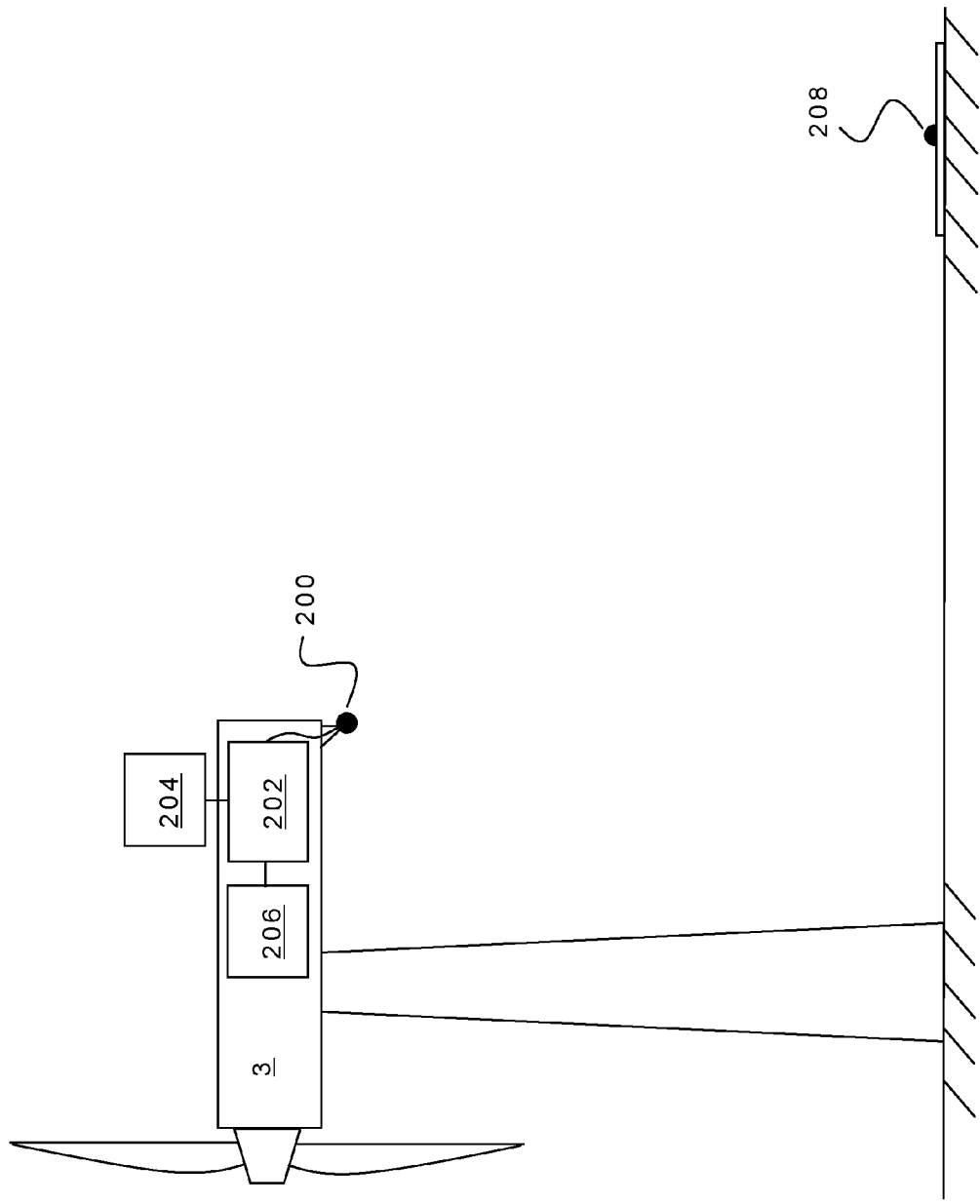
FIG. 2 shows an acoustic noise monitoring system in-situ on a wind turbine.

FIG. 2 shows an acoustic noise monitoring system in-situ on a wind turbine, such as the wind turbine shown in FIG. 1. As can be seen, the acoustic noise monitoring system comprises a microphone 200, a controller 202 that includes amongst other components a processor, a set of meteorological sensors 204, and a set of wind turbine operating conditions sensors 206. The system may be housed within the wind turbine nacelle 3. However, as can be seen, the microphone 200 is positioned on the exterior of the nacelle, and in particular on the bottom and towards the rear of the nacelle. Of course, other suitable locations for the microphone can be envisaged, and will be dependent, among other factors, on the design of the wind turbine nacelle.

The position of the microphone is such that the influence of external noises generated by the components of the wind turbine are minimised. Alternatively, the system may comprise a plurality of microphones, and this may enable more accurate measurements to be taken since the effects of noises generated by wind turbine components may be further reduced. For example, the system may comprise two microphones, one positioned on each bottom rear corner of the nacelle.

The set of meteorological sensors 204 includes an anemometer for measuring wind speed, a weather vane for measuring wind direction, a thermometer (such as a thermocouple device) for measuring the air temperature, and a barometer for measuring the atmospheric pressure.

The set of operating conditions sensors 206 includes a load meter for measuring the load on the wind turbine, a power output meter for measuring the power output of the wind turbine, various thermometers (such as thermocouple devices, or optical fibre sensors) for measuring the temperature of the wind turbine components, and various strain gauges (such as foil gauges or optical fibre sensors) for measuring the strain of the wind turbine components. Further sensors, such as pitch sensors, yaw sensors, rpm of the rotor sensors, torque sensors, and turbine generator current sensors, may be incorporated as required.

FIG. 2 also shows a microphone 208 positioned on the ground and behind the wind turbine. The position of microphone 208 is that specified in the IEC 61400-11 standard. The microphone is used to measure acoustic noise in accordance with the IEC 61400-11 standard which aims to ensure consistency and accuracy in the measurement and analysis of acoustical emissions by wind turbine generator systems. However, the ground level microphone 208 is not suitable for providing real-time continuous measurements, and so has little benefit with regard to optimising the acoustic noise generation of a wind turbine.

IEC 61400-11:2002 "Wind turbine generator systems—Part 11: Acoustic noise measurement techniques" is hereby incorporated by reference, but a brief overview of the measurements taken will now be provided.

Three primary measurements are taken which are: equivalent continuous A weighted sound pressure level; one-third octave band spectra; and narrow band spectra (tonality). Each measurement is taken over a range of wind speeds.

Equivalent continuous A weighted sound pressure level uses the A-frequency-weighting curve (which is based on equal loudness contours) to weight the measured acoustic noise. The provides an indication of the apparent sound power level.

One-third octave band spectra measurements are taken with centre frequencies in the range of 50 Hz to 10 kHz. Both the equivalent continuous A weighted sound pressure level and the one-third octave band spectra are corrected for background acoustic noise. The background measurements are taken when the wind turbine is not in operation.

Narrow band spectra measurements are taken to provide a measure of the tonality of the acoustic noise generated by the wind turbine. Tonality is a measure of the proportion of tonal components in the spectrum of a complex signal. In effect, this involves determining local maxima in the spectrum to determine tones audible by a human.

Additional measurements may be made according to the IEC 61400-11 standard, and can therefore be made by the present acoustic noise monitoring system. Those measurements are infrasound (i.e. sound that has a frequency less than the normal limit of human hearing—20 Hz—but has a sound pressure level sufficiently high for humans to perceive the sound), low-frequency noise (i.e. sound that has a frequency less than about 200 Hz), and impulsivity (i.e. a measure of periodic fluctuations in the acoustic noise, especially relating to sound with high pressure levels).

The microphone 200 positioned on the wind turbine nacelle is of a similar specification to the microphone 208 positioned on the ground. The specification of the microphones is provided in IEC 61400-11. Further specifications of the microphone and the recording equipment can be found in IEC 60804, IEC 61260, and IEC 60651 (type 1 instrumentation) all three documents are hereby incorporated by reference. However, in brief, the microphone 200 is capable of operating over the frequency range 20 Hz to 11,200 Hz, and has a constant frequency response over at the frequency range 45 Hz to 11,200 Hz (preferably, the constant frequency response is over the entire operating range of 20 Hz to 11,200 Hz). The diameter of the microphone is no greater than 13 mm. In addition, a shield is provided over the microphone to reduce the effects of wind noise on the acoustic noise measurements. The shield may be an open cell foam sphere. Alternatively, where the microphone is mounted within a gimbal mechanism, as described below, the shield may be conical in shape.

Acoustic noise measurements are also made when the wind speed is negligible, and the wind turbine is not in operation so that the background noise can be determined. The background noise may then be subtracted from the acoustic noise measurements as appropriate.

Figure 3:
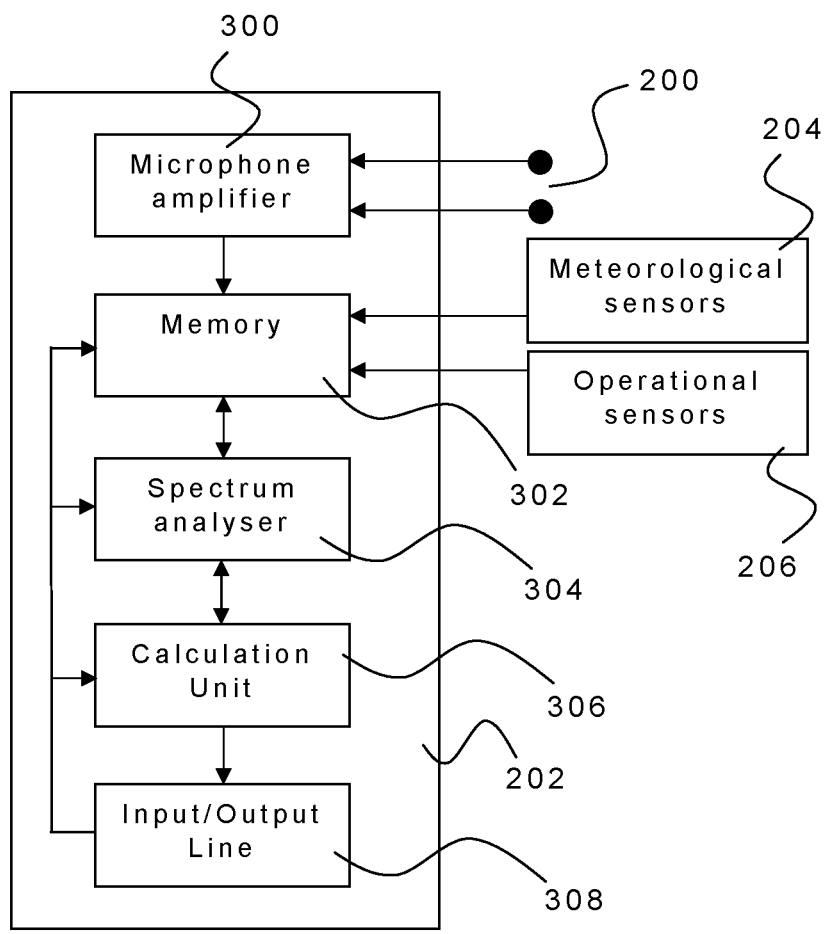
FIG. 3 shows a schematic diagram of a controller within the acoustic noise monitoring system.

FIG. 3 shows a schematic diagram of the controller 202 within the acoustic noise monitoring system. The controller includes a microphone amplifier 300 adapted to amplify the signal received from the microphone 200. The amplifier feeds the amplified signal into storage memory 302, where the measured acoustic noise is stored. In addition, the meteorological sensors 204 and the operating conditions sensors 206 provide signals to the storage memory, and those sensor signals are time synchronised with the acoustic noise measurement and stored for later retrieval. The spectrum analyser 304 is in communication with the storage memory 302, and receives the measured acoustic noise. The spectrum analyser is adapted to perform a spectral analysis of the signal and break down the signal into its various frequency components.

The calculation unit 306 is in communication with the spectrum analyser 306, and is adapted to calculate the various measurements as described above. Those measurements are equivalent continuous A weighted sound pressure level, one-third octave band spectra, and narrow band spectra (tonality).

The processed acoustic noise data is then stored in the memory, and may be output via output 308 to an external source when necessary. For example, a regular upload to a remote storage memory may be performed. This upload may be via a wireless network, or over a wired data connection.

In order for the measurements taken by the microphone on the nacelle to be comparable to those taken according to the IEC 61400-11 standard, it is necessary to apply a transfer function to the data in order to correlate the two set of acoustic noise data. This enables the measurements made at the wind turbine nacelle to be converted such that they are equivalent to measurements made on the ground according to the IEC 61400-11 standard.

The transfer function is developed by making a series of measurements at pre-defined wind speeds at both the ground location and using the nacelle mounted microphone. The measurements are then plotted to determine the relationship between the two series of measurements, and a curve is fitted to the plotted data. The function associated with the curve is then utilised as the transfer function. It is expected that the transfer function between the two sets of measurements will be linear, and that the offset will be in the range of 12 dB to 15 dB; i.e. the measurement taken on the nacelle will be between 12 dB to 15 dB higher than an equivalent measurement taken at ground level.

A transfer function is developed for each type of measurement taken, and hence a transfer function is provided for equivalent continuous A weighted sound pressure level, one-third octave band spectra, and narrow band spectra (tonality). Providing a transfer function for each type of measurements increases the accuracy of the nacelle microphone measurements.

The continuous acoustic noise measurements recorded by the nacelle microphone are utilised in the optimisation of the design of the wind turbine. Measurements can be made of the acoustic noise generated by prototype wind turbines, and the design of the rotor and other influencing factors can be adjusted to increase the power output and loads, while remaining within the noise restrictions of legislation. In addition, once the prototype is finalised, an operational envelope can be determined whereby within the envelope the noise generated is within acceptable limits. This enables the wind turbine to be controlled in use to maximise the power generated by the wind turbine while remaining within the noise limits.

In the case of utilising the acoustic noise monitoring system to control a wind turbine, the system operates as described above. However, the calculation unit is adapted to calculate whether the noise being generated is approaching legislated noise limits, for example due to a change in wind speed or wind direction. The operating envelope, as described above, is stored within the memory 302. The calculation unit calculates the change in operating parameters required to ensure the noise limits do not exceed the limits, and outputs a control signal, via the output 308, to the wind turbine controller. The output signal reduces, for example, the power output of the wind turbine and thus the noise being generated until a suitable noise output is reached. This may require the wind turbine to be shut down completely. In this case, the acoustic noise data may not be stored for any longer than is required to calculate the control signal.

Finally, the calculation unit may take the meteorological data into account when determining whether a control signal need be sent to the wind turbine to reduce the noise being generated. For example, the noise generated may need to be limited when the wind is in a certain direction, since the wind turbine may be upstream of dwellings or the like where noise may have a greater effect.

FIG. 4 show a mounting system for the microphone used in the acoustic noise monitoring system. The mounting system comprises a first part, as shown in FIG. 4(a), which receives the microphone 200, and allows the microphone connection cable 400 to exit from the rear of the mount. As described above, the microphone is provided with a conical wind shield 402. The entire wind shield may be made from an open cell foam, or alternatively only a portion of the wind shield is made from foam. In this alternative, a cylindrical section adjacent the microphone is made from foam, and the remainder of the wind shield is made from a durable plastic.

The microphone 200 is held between the two halves of the mount 404 and 406. To prevent the microphone from receiving excess vibration, and to resiliently hold the microphone the interior of the mount components 404 and 406 are lined with a rubber sheet material, or the like. Each of the mount components 404 and 406 have fins 408. The fins are provided to align the microphone with the local air flow when mounted to the wind turbine nacelle. The mount components 404 and 406 also each have a mounting pin 410. The mounting pin is located at the centre of gravity of the microphone mounting unit (when the microphone is installed).

As shown in FIG. 4(b), the mounting pins 410 engage with holes 412, and enable the pitch of the microphone to vary in accordance with the local air flow. The swivel pin 414 enables the yaw of the microphone to vary in accordance with the local air flow. Finally, the mounting bracket 416 which is coupled to the microphone mount via the swivel pin 414 allows the entire gimbal mechanism to be mounted to the exterior of the nacelle.

The combination of the gimbal mechanism and the wind shield reduces the effect of wind noise on the acoustic noise measurements. The gimbal mechanism aligns the microphone with the air flow and reduces the effect of noise that may otherwise have been generated by, for example, vortexes shedding from the microphone mount if it were not aligned to the air flow. This mechanism also allows for a more consistent measurement, and hence the transfer function is more accurate.

Although the controller has been described in terms of separate hardware components, this is solely to illustrate the functionality of the controller in a clear manner. It would be possible in practice to provide the hardware components as software or hardware, or as any combination of single or combined components.

The invention has been described with reference to example implementations, purely for the sake of illustration. The invention is not to be limited by these, as many modifications and variations would occur to the skilled person. The invention is to be understood from the claims that follow.

Each feature disclosed in the description, and (where appropriate) the claims and drawings may be provided independently or in any appropriate combination.

What is claimed is:

1. An acoustic noise monitoring system for a wind turbine, comprising:
    a first microphone mounted to the exterior of a nacelle of the wind turbine and configured for monitoring acoustic noise;
    a second microphone for monitoring acoustic noise at a remote location from the wind turbine;
    a controller comprising a processor and a storage memory, wherein the controller is configured to:
        receive operating conditions data from the wind turbine,
        receive a first set of data from the first microphone, wherein the first set of data comprises a first series of measurements at predefined wind speeds, and
        receive a second set of data from the second microphone, wherein the second set of data comprises a second series of measurements at the predefined wind speeds,
        determine a transfer function based on the first set of data and the second set of data, and
        provide a control signal to a wind turbine controller that controls at least one of a plurality of operating parameters of the wind turbine, wherein the control signal is based on the transfer function.

2. The system according to claim 1, wherein the system is configured to continuously monitor the acoustic noise using at least one of the first and second microphones.

3. The system according to claim 1, wherein the system is configured to monitor the acoustic noise using at least one of the first and second microphones at intervals.

4. The system according to claim 1, wherein the system is configured to monitor an overall sound pressure level of the acoustic noise using at least one of the first and second microphones.

5. The system according to claim 4, wherein the controller is further configured to receive from at least one of the first and second microphones overall sound pressure level data, and wherein the transfer function is a sound pressure level transfer function applied to the overall sound pressure level data.

6. The system according to claim 1, wherein the system is configured to monitor a tonality of the acoustic noise using at least one of the first and second microphones.

7. The system according to claim 6, wherein the controller is further configured to receive from at least one of the first and second microphones tonality data, and wherein the transfer function is a tonality transfer function applied to the tonality data.

8. The system according to claim 1, wherein the system is configured to monitor one-third octave bands of the acoustic noise using at least one of the first and second microphones.

9. The system according to claim 8, wherein the controller is further configured to receive from at least one of the first and second microphones one-third octave bands data, and wherein the transfer function is a one-third octave band transfer function applied to the one-third octave bands data.

10. The system according to claim 1, wherein said second set of data measured at the remote location is measured in compliance with standard IEC 61400-11.

11. The system according to claim 1, wherein the system has a substantially constant frequency response over the frequency range 20 Hz to 11,200 Hz.

12. The system according to claim 1, wherein the first microphone is positioned so as to reduce noise from components within the nacelle.

13. The system according to claim 1, wherein at least one of the first and second microphones comprise a wind screen.

14. The system according to claim 1, further comprising mounting means for orienting the first microphone with a local air flow.

15. The system according to claim 14, the mounting means comprising a gimbal arrangement, wherein the gimbal arrangement provides the first microphone with at least two degrees of freedom.

16. The system according to claim 15, wherein the gimbal arrangement comprises a plurality of fins coupled to the first microphone to orient the first microphone with the local air flow.

17. The system according to claim 1, wherein the operating conditions data includes meteorological data, and wind turbine performance data.

18. The system according to claim 17, wherein the meteorological data includes at least one of: atmospheric pressure; wind speed; wind direction; air temperature; and humidity.

19. The system according to claim 17, wherein the wind turbine performance data includes at least one of: load; power output; generator currents; pitch; yaw; yaw error; rpm; torque; and operating temperatures.

20. The system according to claim 1, wherein the operating parameters comprise: load parameters; pitch parameters; rpm parameters; and power output parameters.

21. The system according to claim 20, wherein the wind turbine controller is configured to adjust at least one of the load, the pitch, the rpm and the power output, to reduce acoustic noise generated by the wind turbine.

22. The system according to claim 1, wherein the controller is configured to shut down the wind turbine if the acoustic noise generated by the wind turbine rises above a threshold value.

23. The system according to claim 22, wherein the controller is configured to shut down the wind turbine if a tonality of the acoustic noise rises above a threshold value.

24. The system according to claim 1, wherein the transfer function is a curve fitted to the first set of data and the second set of data.

25. A wind turbine comprising an acoustic noise monitoring system according to claim 1, wherein at least one microphone is mounted to the exterior of the wind turbine nacelle.

26. The wind turbine according to claim 25, wherein the wind turbine controller is configured to adjust at least one of the load, the pitch, the rpm and the power output, to reduce acoustic noise generated by the wind turbine.

27. A method for monitoring acoustic noise for a wind turbine, wherein the wind turbine comprises a first microphone for monitoring acoustic noise mounted to the exterior of a nacelle of the wind turbine, the method comprising:
receiving operating conditions data,
receiving a first set of data from the first microphone, wherein the first set of data comprises a series of measurements at predefined wind speeds,
receiving a second set of data from a second microphone located remotely from the wind turbine, wherein the second set of data comprises a series of measurements at the predefined wind speeds,
determining a transfer function based on the first set of data and the second set of data, and
providing a control signal to a wind turbine controller that controls at least one of a plurality of operating parameters of the wind turbine, wherein the control signal is based upon the transfer function.

28. The method according to claim 27, wherein the wind turbine controller is configured to adjust at least one of the load, the pitch, the rpm and the power output, to reduce acoustic noise generated by the wind turbine.

* * * * *